United States Patent
Lipson

(10) Patent No.: US 8,748,829 B2
(45) Date of Patent: Jun. 10, 2014

(54) UV CURING SYSTEM WITH REMOTE CONTROLLER

(71) Applicant: Ronald Lipson, Orchard Lake, MI (US)

(72) Inventor: Ronald Lipson, Orchard Lake, MI (US)

(*) Notice: Subject to any disclaimer, the term of this patent is extended or adjusted under 35 U.S.C. 154(b) by 0 days.

(21) Appl. No.: 13/920,924

(22) Filed: Jun. 18, 2013

(65) Prior Publication Data

US 2013/0277577 A1   Oct. 24, 2013

Related U.S. Application Data

(63) Continuation of application No. 11/432,184, filed on May 11, 2006, now abandoned.

(60) Provisional application No. 60/679,868, filed on May 11, 2005.

(51) Int. Cl.
*B05D 3/06* (2006.01)

(52) U.S. Cl.
USPC ............... 250/365; 250/461.1; 250/504 R

(58) Field of Classification Search
USPC ............ 250/341.1, 363.01, 365, 393, 461.1, 250/492.1, 504 R; 156/275.5, 379.6; 607/88, 90, 94; 422/186, 186.3
See application file for complete search history.

(56) References Cited

U.S. PATENT DOCUMENTS

| | | | |
|---|---|---|---|
| 2,221,079 A | 11/1940 | Eddy | |
| 2,387,764 A | 10/1945 | Maxwell | |
| 3,005,087 A | 10/1961 | Klein | |
| 4,575,636 A | 3/1986 | Caprari | |
| 4,625,120 A | 11/1986 | Caprari | |
| 4,767,253 A | 8/1988 | Luck | |
| 4,797,736 A | 1/1989 | Kloots et al. | |
| 5,013,924 A | 5/1991 | Armstrong et al. | |
| 5,282,145 A | 1/1994 | Lipson et al. | |
| 5,497,295 A | 3/1996 | Gehly | |
| 5,676,820 A | 10/1997 | Wang et al. | |
| 5,803,905 A | 9/1998 | Allred et al. | |
| 5,811,503 A | 9/1998 | Herold et al. | |
| 5,853,215 A | 12/1998 | Lowery | |
| 5,858,163 A * | 1/1999 | Wood et al. | 156/350 |
| 6,051,091 A * | 4/2000 | Wood et al. | 156/103 |
| 6,106,665 A * | 8/2000 | Wood et al. | 156/379.6 |
| 6,207,118 B1 | 3/2001 | Gaven et al. | |
| 6,447,537 B1 | 9/2002 | Hartman | |
| 6,520,663 B1 | 2/2003 | Holmes et al. | |
| 6,907,109 B2 | 6/2005 | Polichar et al. | |
| RE39,162 E | 7/2006 | Caplan et al. | |
| 7,250,611 B2 | 7/2007 | Aguirre et al. | |
| 7,293,570 B2 | 11/2007 | Jackson | |
| 2002/0074559 A1 | 6/2002 | Dowling et al. | |

(Continued)

*Primary Examiner* — Bernard E Souw
(74) *Attorney, Agent, or Firm* — Gifford, Krass, Sprinkle, Anderson & Citkowski, P.C.

(57) ABSTRACT

An ultraviolet curing system separates the source of ultraviolet radiation and the controller, allowing an operator to stand at a relatively great distance away from the ultraviolet radiation when applied. The apparatus includes a base unit and a source of intense ultraviolet (UV) radiation coupled to the base unit by way of a pivoting arm. A controller, disposed remotely from the base unit, allows an operator to activate the source of UV radiation at a distance of at least several feet away from the source. The preferred embodiment allows an operator to control the UV radiation at a distance of 10 to 100 feet or more using a wired or wireless interconnection between the controller and the base unit. A detachable infrared lamp may be optionally disposed along side the UV source.

6 Claims, 4 Drawing Sheets

(56) References Cited

U.S. PATENT DOCUMENTS

| | | |
|---|---|---|
| 2003/0108710 A1 | 6/2003 | Coyle et al. |
| 2005/0018595 A1 | 1/2005 | Conroy et al. |
| 2006/0273265 A1 | 12/2006 | Lipson |
| 2007/0086912 A1 | 4/2007 | Dowling et al. |
| 2007/0105401 A1 | 5/2007 | Liu et al. |
| 2007/0122185 A1 | 5/2007 | Yamazaki et al. |
| 2007/0202021 A1 | 8/2007 | Willette |
| 2007/0247800 A1 | 10/2007 | Smith et al. |

* cited by examiner

# UV CURING SYSTEM WITH REMOTE CONTROLLER

REFERENCE TO RELATED APPLICATIONS

This application is a continuation of U.S. patent application Ser. No. 11/432,184, filed May 11, 2006, which claims priority from U.S. Provisional Patent Application Ser. No. 60/679,868, filed May 11, 2005, the entire content of both of which is incorporated herein by reference.

FIELD OF THE INVENTION

This invention relates generally to ultraviolet-light curing apparatus and, in particular, to a system separates the source of ultraviolet radiation and the controller, allowing an operator to stand at a relatively great distance away from the ultraviolet radiation when applied.

BACKGROUND OF THE INVENTION

UV-cured paints, overcoats and other polymers are becoming increasingly popular, since drying time can be reduced to a matter of seconds. Accordingly, in many applications, particularly where time is of the essence, UV-curable paints and other coatings now compete with air-dried formulations. One such time-sensitive application is automobile body and restoration.

A distinct problem with UV-curable materials is safety, since the strong ultraviolet radiation used in the curing process can be damaging to the retina, skin, or other body parts. This safety issue is apparent in prior-art auto-body curing systems, such as the unit shown in FIG. 1. To cure a coating made onto a repair of a vehicle 102, a stand-alone unit 110 is used having an integral control panel (not shown) causing ultraviolet radiation 122 to strike the surface of the vehicle when placed in close proximity thereto. The unit is typically placed on some sort of a stand, which may be moveable. A distinct drawback with such an arrangement is that the operator must stand right next to the unit while the ultraviolet radiation is being applied, thereby exposing the user to harmful rays.

SUMMARY OF THE INVENTION

This invention improves upon existing systems by decoupling the source of ultraviolet radiation and the controller in two separate units, thereby allowing an operator to stand at a relatively great distance away from the ultraviolet radiation when applied.

The apparatus includes a base unit and a source of intense ultraviolet (UV) radiation coupled to the base unit by way of a pivoting arm. A controller, disposed remotely from the base unit, allows an operator to activate the source of UV radiation at a distance of at least several feet away from the source. The preferred embodiment allows an operator to control the UV radiation at a distance of 10 to 100 feet or more using a wired or wireless interconnection between the controller and the base unit. A detachable infrared lamp may be optionally disposed along side the UV source.

DETAILED DESCRIPTION OF THE INVENTION

Figure 1:
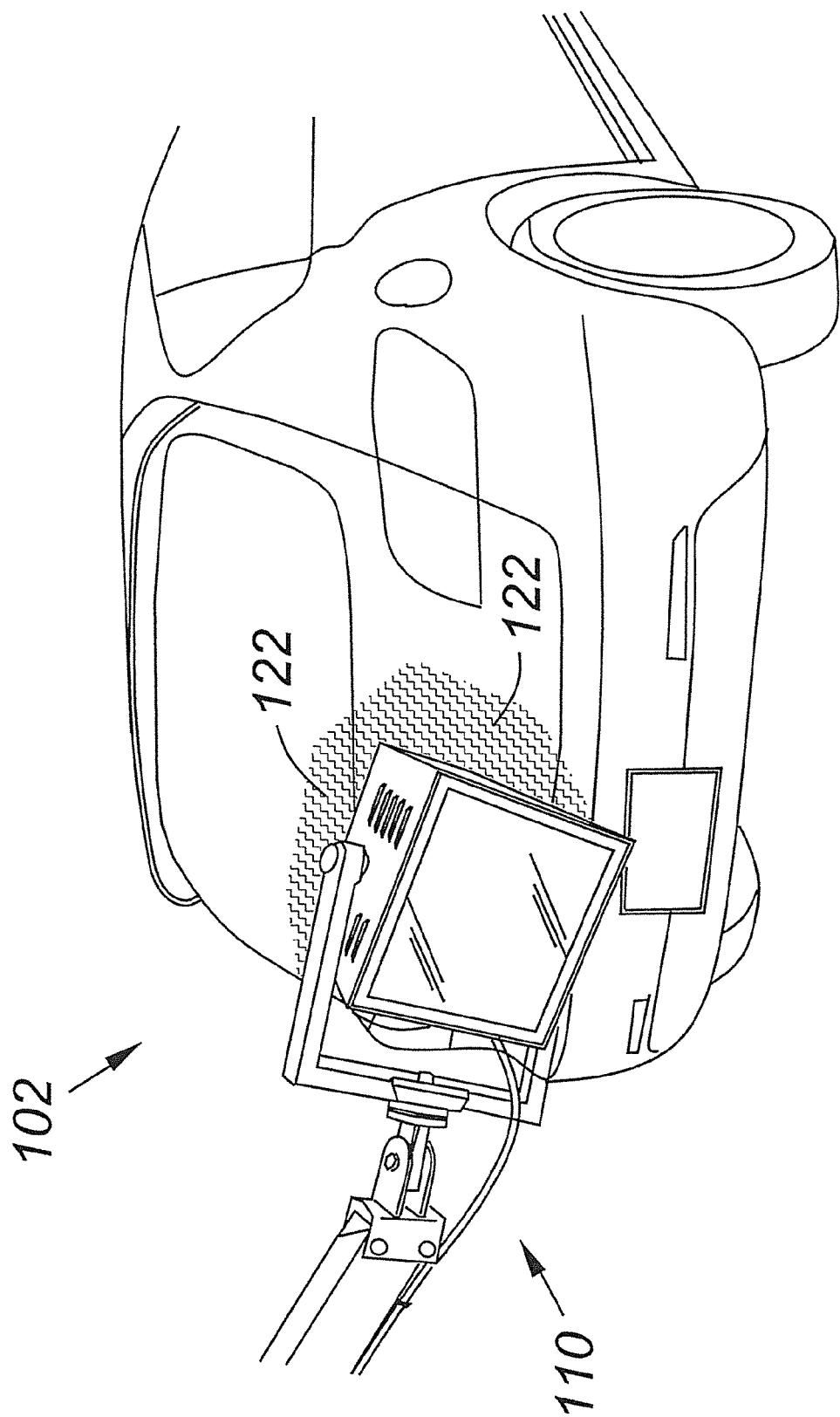
FIG. 1 is a perspective drawing of a prior art UV curing system showing how harmful ultraviolet rays may be seen by a nearby operator.
Figure 2:
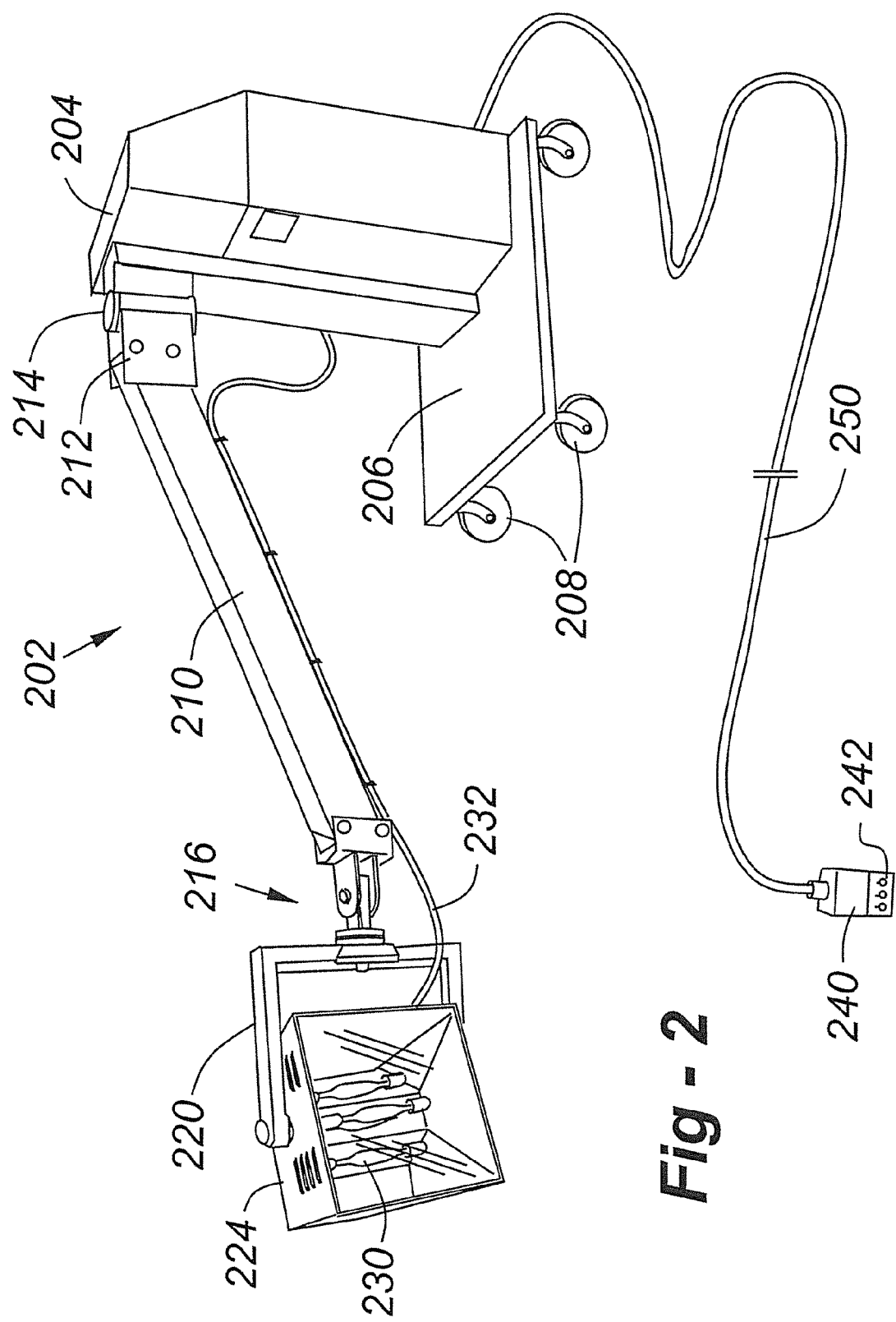
FIG. 2 is a drawing of a preferred embodiment of the invention utilizing an elongate cord connected to a remote controller.

Referring now to FIG. 2, there is shown generally at 202 a preferred embodiment of the invention. A base unit 204 containing the majority of control circuits and other electrical components, is mounted on a platform 206 which is mobile due to casters 208. Attached to the back of control 204, is a bracket including a vertically oriented pivot 214 and a horizontally oriented pivot 212, allowing arm 210 connected thereto to be moved up and down and side-to-side for a preferred placement relative to an article to be cured.

The distal end of the arm 210 is attached to another pivot 216 allowing multiple degrees of freedom of lamp housing 224 coupled to the pivot 216 through a U-shaped bracket 220. Multiple ultraviolet lamps 230 contained in the housing 224, are controlled by way of a cable 232 which attaches to the base unit.

In contrast to existing equipment, a remote controller 240 is provided, having switches 242 associated with the cook control of the UV lamps. The controller 240 is connected to the base unit through a cable 250 in this case, allowing an operator to stand a relatively great distance away from the lamps in housing 224, thereby affording greater protection than if the operator were close to the surface being cured. In the preferred embodiment, the cable 250 is greater than 20 feet, and may be as long as 100 feet or more, allowing the operator to even walk into a different room once the equipment is set up.

Figure 3:
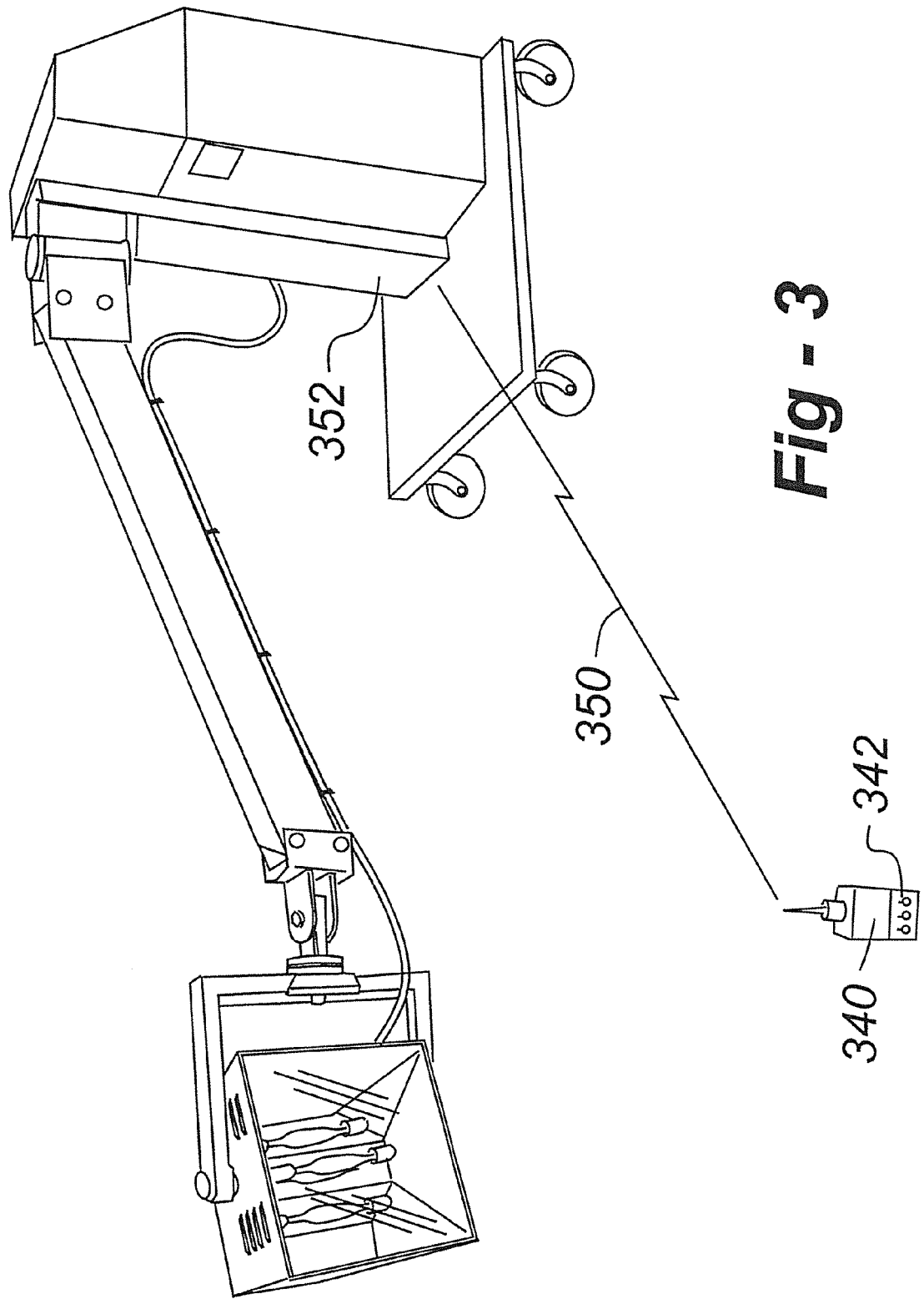
FIG. 3 is an alternative preferred embodiment of the invention, wherein the remote controller is wirelessly coupled to a base unit.

FIG. 3 is a drawing which shows a different embodiment of the invention, wherein at least the ultraviolet lamp controls are turned on and off through a remote controller 340 using controls 342 but wherein, in this case, wireless communication occurs by way of RF path 350 to a receiver 352 contained in the base unit. Infrared control may also be used, however, this would a line-of-sight disposition of the remote. To ensure that the ultraviolet light is not triggered by an unwanted source, digital communication is used between the remote and base unit, with some form of digital queue, password or other authentication information as required before activation of the lamps.

Figure 4:
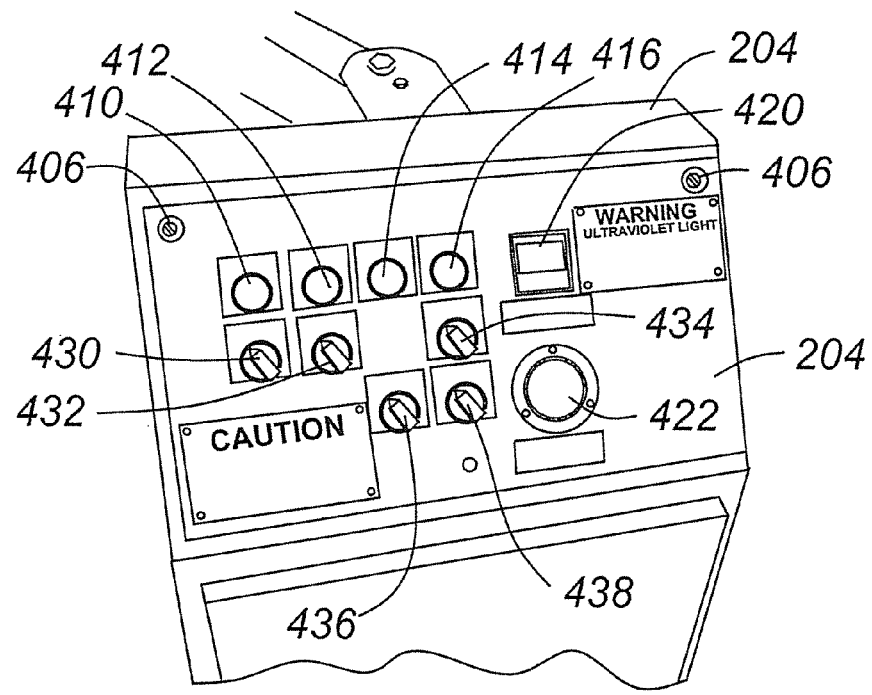
FIG. 4 is a detailed drawing of a control panel associated with equipment constructed in accordance with the invention.

FIG. 4 is a detailed drawing of the control panel 402 from an operator's perspective. Panel 402 is preferably hinged with bolts 406 holding the panel in position during use. Indicator lamp 410 shows when the power is on, and indicator lamp 412 shows when ultraviolet light is being emitted. Indicators 414 and 416 show 200- and 300-watt intensity, respectively.

Switch 430 is used to turn main power on and off, where switch 432 is used to turn UV lamp power on and off, assuming the unit is in the local mode using switch 436. The other position of switch 436 is remote, which, in this position, only the remote unit can be used to activate the ultraviolet lamps.

Switch 434 is used to switch between lamp intensity 200 watts to 300 watts, and switch 438 is used to activate a time mode, if desired. Item 420 is a cycle timer, and item 422 is an elapsed time meter.

Figure 5:
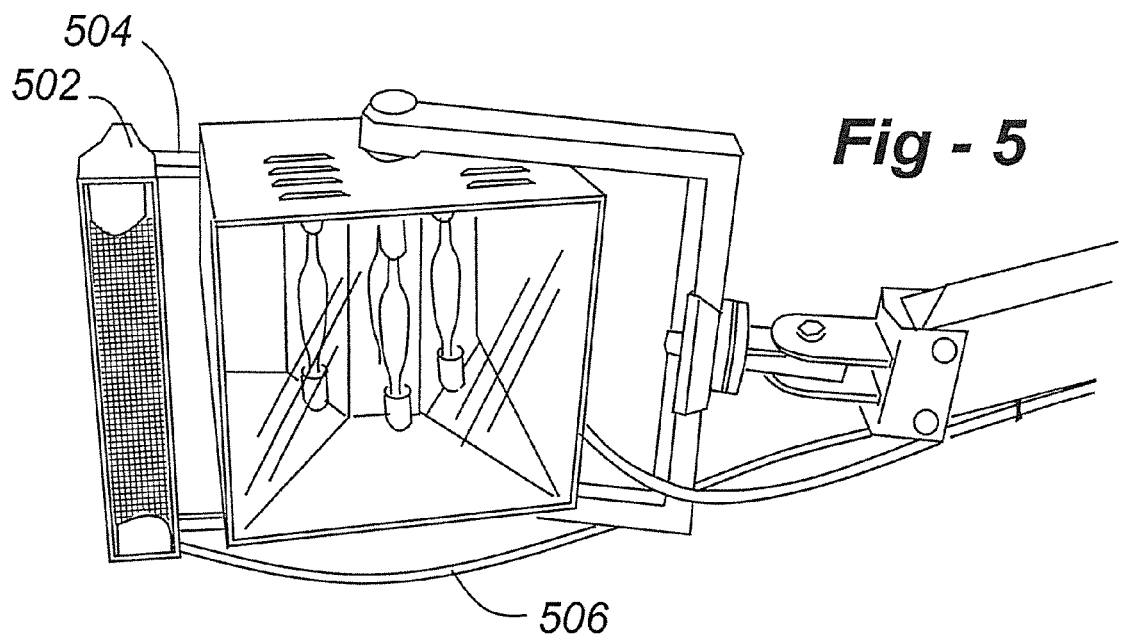
FIG. 5 is detailed drawing of an optional infrared heater attached to an ultraviolet curing head.

FIG. 5 is a perspective drawing which shows the optional use of an infrared lamp 502 removably connected to the ultraviolet lamp housing to standoffs 504. An infrared lamp is coupled to the base unit through a separate cable 506, with additional controls being supplied if this option is selected. The need for infrared and ultraviolet lamps is still required, since undercoats are generally cured through heat, whereas overcoats may now be cured with ultraviolet. Should the time come when all types of paint are UV-cured, the need for the infrared option may no longer be necessary.

I claim:

1. An ultraviolet curing system, comprising:
   a base unit mounted on a mobile, rolling platform;
   a lamp housing including a source of intense ultraviolet (UV) radiation suitable for curing paint, an overcoat or other polymeric materials;
   a pivoting arm coupling the lamp housing to the base unit with multiple degrees of freedom enabling the lamp housing to be moved up and down and side-to-side for a preferred placement of the UV radiation relative to a surface to be cured; and
   a controller disposed remotely from the base unit allowing an operator to activate the source of UV radiation at a distance of at least several feet away from the source.

2. The curing system of claim 1, wherein the controller is connected to the base unit through a cable having a length of 10 to 100 feet.

3. The curing system of claim 1, wherein the controller is in wireless communication to the base unit.

4. The curing system of claim 1, further including a detachable infrared lamp disposed alongside the UV source.

5. The curing system of claim 1, further including a password or other authentication before the UV radiation may be activated.

6. The curing system of claim 1, wherein the UV radiation is at least 200 watts.

\* \* \* \* \*